United States Patent
Bruls

(10) Patent No.: US 9,866,824 B2
(45) Date of Patent: *Jan. 9, 2018

(54) POSITION INDICATOR FOR 3D DISPLAY

(71) Applicant: KONINKLIJKE PHILIPS N.V., Eindhoven (NL)

(72) Inventor: Wilhelmus Hendrikus Alfonsus Bruls, Eindhoven (NL)

(73) Assignee: KONINKLIJKE PHILIPS N.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/398,823

(22) Filed: Jan. 5, 2017

(65) Prior Publication Data

US 2017/0127054 A1    May 4, 2017

Related U.S. Application Data

(63) Continuation of application No. 14/009,555, filed as application No. PCT/IB2012/051832 on Apr. 13, 2012, now Pat. No. 9,560,344.

(30) Foreign Application Priority Data

Apr. 20, 2011 (EP) ..................................... 11163133

(51) Int. Cl.
    *H04N 13/04* (2006.01)
(52) U.S. Cl.
    CPC ..... *H04N 13/0445* (2013.01); *H04N 13/0425* (2013.01); *H04N 13/0497* (2013.01)
(58) Field of Classification Search
    CPC ........... H04N 13/0425; H04N 13/0497; H04N 13/0445

USPC ........................................................... 348/51
See application file for complete search history.

(56) References Cited

U.S. PATENT DOCUMENTS

| | | | |
|---|---|---|---|
| 6,055,013 | A | 4/2000 | Woodgate et al. |
| 2004/0150585 | A1 | 8/2004 | Tomisawa |
| 2004/0240777 | A1 | 12/2004 | Woodgate |

(Continued)

FOREIGN PATENT DOCUMENTS

| | | |
|---|---|---|
| EP | 1415483 A2 | 5/2004 |
| EP | 1450567 A1 | 8/2004 |
| EP | 1658733 B1 | 5/2006 |

(Continued)

OTHER PUBLICATIONS

English machine translation of FR 288000 European application.*

(Continued)

*Primary Examiner* — Nguyen Truong

(57) ABSTRACT

A device 120 for processing three-dimensional [3D] image data 122 for display on a 3D display 160, the 3D display being arranged for adjacently emitting, in a viewing cone 180, a series of views 100 of the 3D image data, the series of views enabling autostereoscopic viewing of the 3D image data at multiple viewing positions 182, 184 in the viewing cone by a viewer perceiving two different ones of the series of views, and the device comprising an indicator generator 140 arranged for establishing a graphical shape in the 3D image data for, when being displayed on the 3D display, providing to the viewer a position indicator graphically representing a relative position of the two different ones of the series of views within the series of views.

16 Claims, 9 Drawing Sheets

(56) References Cited

U.S. PATENT DOCUMENTS

2008/0247042 A1   10/2008   Scwerdtner

FOREIGN PATENT DOCUMENTS

| FR | 2888000 A1 | 1/2007 |
|---|---|---|
| JP | 2005167445 A | 6/2005 |
| WO | 1997023097 A3 | 6/1997 |
| WO | 03015424 A3 | 2/2003 |
| WO | 2011013030 A1 | 2/2011 |

OTHER PUBLICATIONS

Hill et al, "3-D Liquid Crystal Disdplays and Their Applications", Proceedings of the IEEE, vol. 94, No. 3, Mar. 2006, pp. 575-590.

* cited by examiner

POSITION INDICATOR FOR 3D DISPLAY

CROSS-REFERENCE TO PRIOR APPLICATIONS

This application a continuation of U.S. patent application Ser. No. 14/009,555, filed on Oct. 3, 2013, which is U.S. National Phase application under 35 U.S.C. §371 of International Application No. PCT/IB2012/051832, filed on Apr. 13, 2012, which claims the benefit of EP Patent Application No. EP 11163133.9, filed on Apr. 20, 2011. These applications are hereby incorporated by reference herein.

FIELD OF THE INVENTION

The invention relates to a device and method for processing three-dimensional [3D] image data. The invention further relates to the 3D image data, a storage medium comprising the 3D image data and a computer program for processing the 3D image data.

3D displays, and in particular televisions equipped with 3D displays, are increasingly popular amongst consumers, as they provide a viewer with stereoscopic perception of depth. For that purpose, so-termed autostereoscopic 3D displays comprise optical components, e.g., a lenticular lens array, for providing a viewing cone comprising at least a left view and a right view of a scene. This enables the viewer to see a different image with each eye when positioned accordingly within the viewing cone.

Certain autostereoscopic displays, sometimes referred to as automultiscopic displays, provide multiple views of the same scene, rather than only a left and a right view. This allows the viewer to assume multiple positions in the viewing cone, i.e., move left-right in front of the display, while still obtaining a stereoscopic perception of the scene.

However, not all positions assumed by the viewer are equally suitable for obtaining stereoscopic perception of the scene. In particular, when the display is arranged for repeating the viewing cone as a series of viewing cones, a viewer may be positioned such that, e.g., the left eye perceives an outermost right-hand view of a given viewing cone, and the right eye perceives an outermost left-hand view of an adjacent viewing cone. At such a viewing position, a viewer obtains a so-termed pseudoscopic perception of the scene, in which the scene often appears to have a depth, yet which is incorrect. Pseudoscopic perception is known to cause headaches and other symptoms of visual strain.

BACKGROUND OF THE INVENTION

Despite the aforementioned visual strain caused by pseudoscopic perception, it is not always obvious to the viewer that he is positioned at a pseudoscopic viewing position.

U.S. Pat. No. 6,055,013 discloses an autostereoscopic display providing four views in each lobe, i.e., in each viewing cone. It is said that an observer has a wide range of viewing freedom with pseudoscopic viewing positions being present at the boundaries between adjacent lobes. A technique is illustrated for providing an observer with a visual indication of the pseudoscopic positions. For that purpose, a parallax optic is arranged for providing an indication in a central lobe that is dark whereas the indication in adjacent lobes is bright. The next lobes are then again dark, and so on. Thus, at pseudoscopic viewing positions, at least one eye of the observer sees a non-black position indication.

The technique of U.S. Pat. No. 6,055,013 thus allows an observer to distinguish between desired stereoscopic viewing positions and undesirable pseudoscopic viewing positions.

SUMMARY OF THE INVENTION

A problem of the above technique is that it is unsuitable for allowing a viewer to distinguish between the stereoscopic viewing positions within the viewing cone.

It is an object of the invention to provide a device, 3D image data and a method for allowing the viewer to distinguish between the stereoscopic viewing positions within the viewing cone.

According to the invention, this object is realized in that a device is provided for processing 3D image data for display on a 3D display, the 3D display being arranged for adjacently emitting, in a viewing cone, a series of views of the 3D image data, the series of views enabling autostereoscopic viewing of the 3D image data at multiple viewing positions in the viewing cone by a viewer perceiving two different ones of the series of views, and the device comprising an indicator generator arranged for establishing a graphical shape in the 3D image data for, when being displayed on the 3D display, providing to the viewer a position indicator graphically representing a relative position of the two different ones of the series of views within the series of views.

In a further aspect of the invention, 3D image data is provided for display on a 3D display, the 3D display being arranged for adjacently emitting, in a viewing cone, a series of views of the 3D image data, the series of views enabling autostereoscopic viewing of the 3D image data at multiple viewing positions in the viewing cone by a viewer perceiving two different ones of the series of views, and the 3D image data comprising a graphical shape for, when being displayed on the 3D display, providing to the viewer a position indicator graphically representing a relative position of the two different ones of the series of views within the series of views.

In a further aspect of the invention, a method is provided of processing 3D image data for display on a 3D display, the 3D display being arranged for adjacently emitting, in a viewing cone, a series of views of the 3D image data, the series of views enabling autostereoscopic viewing of the 3D image data at multiple viewing positions in the viewing cone by a viewer perceiving two different ones of the series of views, and the method comprising establishing a graphical shape in the 3D image data for, when being displayed on the 3D display, providing to the viewer a position indicator graphically representing a relative position of the two different ones of the series of views within the series of views.

In a further aspect of the invention, a computer program is provided comprising instructions for causing a processor system to perform the method set forth, the computer program being embodied on a computer readable medium.

According to the invention, the 3D image data that is processed is displayable on a 3D display emitting a series of views of the 3D image data, i.e., an autostereoscopic multi-view 3D display. As such, the 3D image data may be so-termed multi-view image data comprising image data for each view. Such 3D image data may be directly displayed on the autostereoscopic multi-view display. Alternatively, the 3D image data may be stereo image data comprising image data for a left view and a right view, or two-dimensional [2D] image data plus depth data. Such 3D image data may need to be processed to obtain the series of views. For that purpose, the 3D display may employ so-termed view interpolation in case of stereo image data, or so-termed view rendering in case of 2D image data plus depth data. It will be appreciated that the above techniques are known from the field of 3D image/video processing, and in particular the field of 3D image/video conversion.

The 3D display emits the series of views in the form of a viewing cone, i.e., as a sequence of views that originate from a display plane of the 3D display, i.e., single plane formed by a light emitting surface of the 3D display, in a cone-shaped manner. For example, the viewing cone of a five-view autostereoscopic 3D display may comprise an outermost left view, an intermediate left view, a middle view, an intermediate right view, and an outermost right view. The viewer obtains stereoscopic viewing of the 3D image data when positioned at a viewing position perceiving two different ones of the series of views, e.g., when perceiving the outermost left view with the left eye and the intermediate left view with the right eye, or the middle view with the left eye and the intermediate right view with the right eye. In general, the two different ones of the series of views may be two adjacent ones. Thus, the 3D display provides stereoscopic display at multiple viewing positions.

The device comprises an indicator generator that processes the 3D image data to establish a graphical shape in the 3D image data. The graphical shape is a drawn or written element having a certain spatial attribute, such as a certain orientation or a certain spatial arrangement. The graphical shape is established in the 3D image data, and as such becomes part of the 3D image data. The graphical shape is arranged for, when being displayed as part of the 3D image data on the 3D display, providing the viewer perceiving the two different ones of the series of views with a position indicator. As such, the graphical shape provides the position indicator in at least one of the two different views. Moreover, the graphical shape provides a graphical representation of a relative position of the two different views within the series of views as the position indicator. As such, the position indicator may indicate that, e.g., the two different views are located in the middle of the series of views.

It will be appreciated that there is typically a strong correspondence between the relative position of the two different views within the series of views which are perceived by the viewer, and a relative viewing position of the viewer within the viewing cone. In particular, when the series of views are evenly distributed within the viewing cone, there may be a direct correspondence between the relative position within the series of views and the relative viewing position within the viewing cone. Thus, the position indicator may also graphically represent the relative viewing position of the viewer within the viewing cone.

The measures according to the invention have the effect that 3D image data is provided that, when being displayed on a 3D display, provides the viewer perceiving two different ones of the series of views with a position indicator that graphically represents a relative position of the views the viewer is currently perceived with respect to the series of views within the viewing cone. Thus, the graphical shape is established in a portion of the 3D image data that corresponds to at least one of the two different ones of the series of views. The relative position indicates to the viewer the position of the two different views he is currently perceiving in relation to the series of views, i.e., visual information is provided to the viewer about how the currently perceived views are positioned within the series of views. Thus, the viewer is able to determine directly from the position indicator whether the two different views he currently perceives are located, e.g., in the middle of the series of views, at a left-hand side of the series of views, etc.

Moreover, by providing a graphical representation of the relative position, the viewer does not need a frame of reference to interpret the position indicator as the graphical representation directly visually portrays the relative position to the viewer.

The invention is partially based on the recognition that not all of the possible two different views within the series of views are equally desirable for obtaining stereoscopic viewing. A reason for this is that only a subset of the series of views may be original recordings of a scene, with the other views being generated by means of interpolation or extrapolation of said subset of views. Interpolation may result in interpolation artifacts appearing in a view, and consequently, interpolated views may have a lower quality than said original views. Moreover, extrapolation may result in extrapolation artifacts appearing in a view, with extrapolation artifacts being typically more severe than interpolation artifacts. Thus, extrapolated views may have a lower quality than interpolated views.

Advantageously, the position indicator may graphically represent a relative position of the two different ones of the series of views with respect to views having a higher quality for allowing the viewer to determine a direction towards a new viewing position that provides to the viewer stereoscopic viewing with a lower amount of artifacts.

Optionally, the indicator generator is arranged for establishing a series of graphical shapes in the 3D image data for, when being displayed on the 3D display, providing to the viewer perceiving any two different ones of the series of views a respective one of a series of position indicators graphically representing the relative position of the respective two different ones of the series of views within the series of views.

By establishing a series of graphical shapes in the 3D image data, the viewer is provided with one of a series of position indicators when perceiving any two different ones of the series of views. Thus, a position indicator is provided at multiple viewing positions within the viewing cone, allowing the viewer to obtain feedback on his viewing position at multiple viewing positions within the viewing cone. Advantageously, the viewer may more easily determine a direction towards a new viewing position that provides to the viewer stereoscopic viewing with a lower amount of artifacts.

Optionally, the 3D display is arranged for emitting the series of views in a series of repeated viewing cones, and the indicator generator is arranged for establishing the graphical shape in the 3D image data for, when being displayed on the 3D display, providing to the viewer perceiving an outermost one of the series of views the position indicator for graphically indicating to the viewer a vicinity of a repeated viewing cone.

The viewer is provided with a position indicator when perceiving at least an outermost one of the series of views, i.e., when having a viewing position at an outermost side of the viewing cone and thus being near to a repeated viewing cone. Thus, the position indicator informs the viewer that he is near the repeated viewing cone. Also, since the position indicator represents the relative position of the outermost one of the series of views within the series of views, the viewer is able determine to which side the repeated viewing cone is located. Advantageously, when the viewer desires to obtain a new viewing position within the viewing cone, he is provided with visual information that allows him to remain within the viewing cone, i.e., not move into a repeated viewing cone.

The abovementioned optional aspect of the invention is partially based on the recognition that the 3D display may provide each of the series of views in an overlapping manner due to an occurrence of so-termed optical cross-talk. Thus, even though the outermost one of the series of views may be used in stereoscopic viewing, the views may suffer from cross-talk from adjacent views of the repeated viewing cone. Advantageously, the viewer may avoid such viewing positions within the viewing cone.

Optionally, the indicator generator is arranged for establishing the graphical shape in the 3D image data for, when being displayed on the 3D display, providing to the viewer perceiving a central one of the series of views the position indicator for graphically indicating to the viewer a vicinity of a center of the viewing cone.

The viewer is provided with a position indicator when perceiving at least a central one of the series of views, i.e., when perceiving views located in a middle of the series of views. Thus, the position indicator informs the viewer that he is at or near a middle of the series of views. It will be appreciated that when the series of views are evenly distributed within the viewing cone, the position indicator informs the viewer that he is at or near a middle, i.e., a central axis, of the viewing cone. Advantageously, when series of views are generated from 2D image data plus depth data, views near the middle of the series of views may comprise a lower amount of artifacts than others. Thus, the viewer may easily determine a viewing position where he is provided with a lower amount of artifacts.

Optionally, the 3D display is optimized for a viewing distance by emitting the viewing cone at a varying emission angle across a display plane of the 3D display, and wherein the indicator generator is arranged for establishing a further graphical shape in the 3D image data for, when being displayed on the 3D display, providing to the viewer a further position indicator graphically representing the relative position of the two different ones of the series of views within the series of views, the position indicator and the further position indicator together constituting a viewing distance indicator.

Since the viewing cone is emitted at a varying emission angle across the display plane, the two position indicators on the screen typically correspond to viewing cones emitted at different emission angles. The position indicators enable the viewer to determine, for each of the viewing cones, a relative position of the two different ones of the series of views within each series of views. It will be appreciated that the 3D display is optimized for providing a viewer at a certain viewing distance within a same two different ones of the series of views in each viewing cone on the display plane to enable the viewer perceiving the same two different ones of the series of views across the entire display. The position indicators enable the viewer to determine whether he indeed perceives the same two different ones of the series of views in both viewing cones. Advantageously, when the viewer determines he does not perceive the same two different ones of the series of views in both viewing cones, he may adjust his viewing distance accordingly.

Optionally, the position indicator and the further position indicator are provided to the viewer on opposite sides of the 3D display. Said configuration of the position indicator and the further position indicator is particularly suitable for constituting a viewing distance indicator.

Optionally, the device comprises the 3D display.

Optionally, the device further comprises a view renderer for generating the series of views in dependence on the 3D image data, the view renderer comprises the indicator generator, and wherein the indicator generator is arranged for establishing the graphical shape in the two different ones of the series of views.

Optionally, the device comprises at least one of the group of: a broadcast receiver for receiving the 3D image data from a broadcast transmission, an internet receiver for receiving the 3D image data from the internet, and a storage medium reader for reading the 3D image data from a storage medium.

Optionally, the graphical shape comprises (i) a reference shape for graphically representing a reference position of a reference view within the series of views, and (ii) a position shape for graphically representing a current position of the two different ones of the series of views within the series of views, and wherein the graphical shape is arranged in the 3D image data for, when being displayed on the 3D display, providing to the viewer a reference part and a position part of the position indicator having a relative spatial alignment graphically representing the relative position of the two different ones of the series of views within the series of views.

The position indicator thus consists of at least two parts, with a reference part representing a reference position of a reference view within the series of views, a position part graphically representing a current position of the two different ones of the series of views within the series of views, and a spatial alignment between the reference part and the position part representing the relative position of the two different ones of the series of views within the series of views. Said configuration of the position indicator is particularly suitable for providing an intuitive graphical representation of said relative position.

Optionally, the 3D image data comprises two-dimensional [2D] image data and depth data for representing a depth of the 2D image data, and wherein the relative spatial alignment of the reference part and the position part of the position indicator is established by (i) establishing the reference shape in the depth data at a neutral depth for providing to the viewer the reference part of the position indicator on a display plane of the 3D display, and (ii) establishing the position shape in the depth data at a non-neutral depth for providing to the viewer the position part of the position indicator protruding or recessing from the display plane of the 3D display.

By providing the reference part of the position indicator on a display plane of the 3D display, the reference part will appear to be located at a fixed position throughout the series of views, i.e., throughout the viewing cone. By providing the position part of the position indicator protruding or recessing from the display plane of the 3D display, the position part will appear to vary in position throughout the series of views, i.e., throughout the viewing cone. A view rendering of the 3D image data will typically result in both parts of the position indicator being spatially aligned in a middle of the series of views, and being increasingly misaligned towards the outermost views of the series of views. The configuration of the graphical shape thus automatically establishes a series of position indicators graphically representing the relative position of the respective two different ones of the series of views within the series of views. Advantageously, the graphical shape is particularly suitable for establishing the position indicator. Advantageously, since the 2D image data plus depth data format is well suited for storage and/or transmission, the graphical shape is also well suited for storage and/or transmission as part of the 3D image data.

Optionally, a storage medium is provided comprising the 3D image data set forth.

It will be appreciated by those skilled in the art that two or more of the abovementioned embodiments, implementations, and/or aspects of the invention may be combined in any way deemed useful.

Modifications and variations of the device, the 3D image data, the method, and/or the computer program, which correspond to the described modifications and variations of the device and/or the 3D image data, can be carried out by a person skilled in the art on the basis of the present description.

The invention is defined in the independent claims. Advantageous embodiments are defined in the dependent claims

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
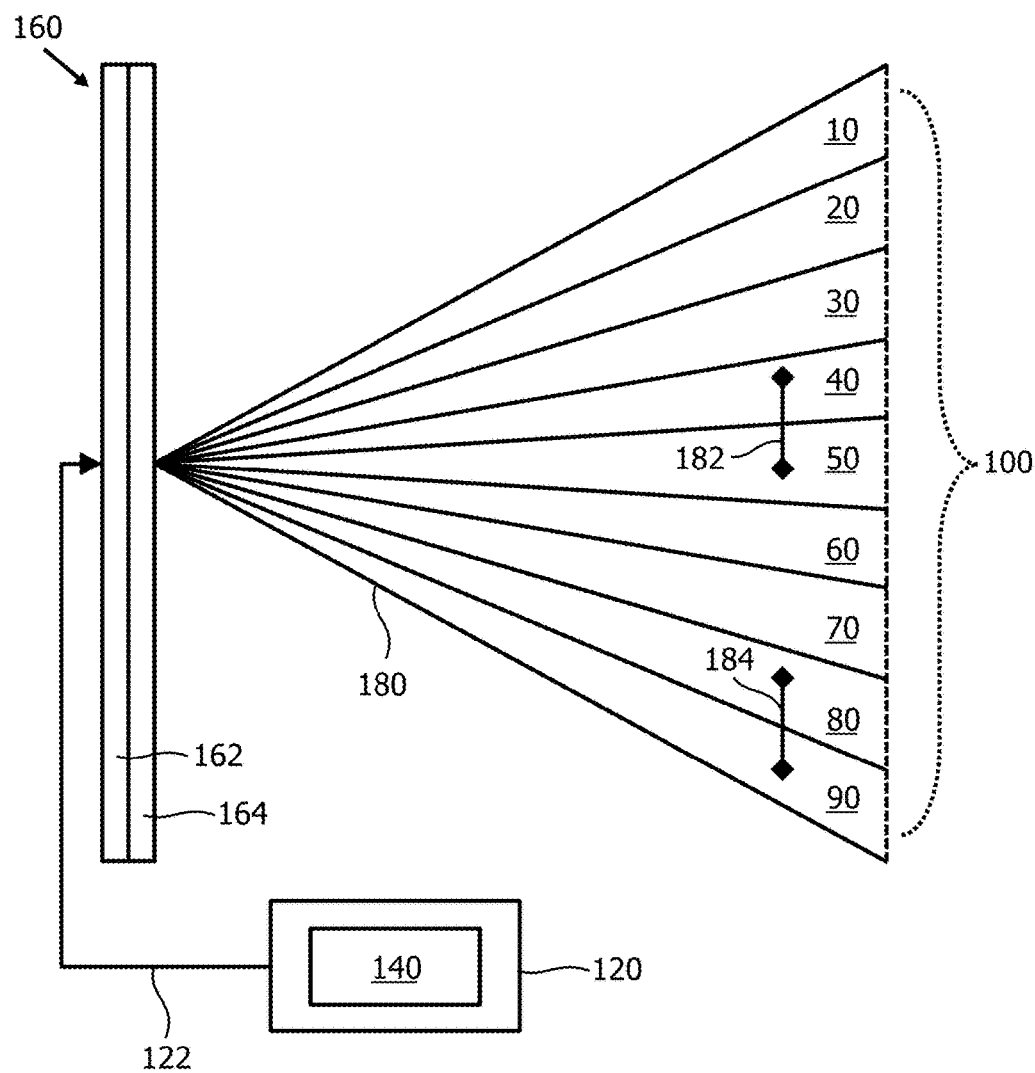
FIG. 1 shows a device for processing 3D image data and a 3D display for displaying the 3D image data by adjacently emitting a series of views.

FIG. 1 shows a device 120 for processing 3D image data 122. The device 120 comprises an indicator generator 140 arranged for establishing a graphical shape in the 3D image data 122. The device 120 is connected to a 3D display 160 to provide the 3D image data 122, in which the graphical shape is established, to the 3D display 160. The 3D display 160 is an autostereoscopic 3D display, and is shown in FIG. 1 as a combination of a display layer 162 and an optical layer 164. The display layer 162 may be, e.g., a Liquid Crystal Display (LCD) layer, or an Organic Light Emitting Diode (OLED) layer. The optical layer 164 may be so-termed lenticular lens array layer, or a parallax barrier layer. These and other examples of optical layers are known in the field of autostereoscopic 3D displays.

The display layer 162 and the optical layer 164 cooperate to adjacently emit, in a viewing cone 180, a series of views 100 of the 3D image data 122. FIG. 1 shows a single viewing cone 180 being emitted from a center of the 3D display 160. It will be appreciated, however, that the display layer 162 and the optical layer 164 cooperate to emit the viewing cone from a plurality of locations located across a display plane of the 3D display 160. For example, when the optical layer 164 comprises a plurality of micro lenses, each of the plurality of micro lenses may emit a viewing cone identical or similar to the viewing cone 180. For sake of explanation, however, FIG. 1 only shows a single viewing cone.

The viewing cone 180 comprises the series of views 100. FIG. 1 shows a top-down view of the 3D display 160 and the viewing cone 180. Thus, the series of views 100 comprises a right-most view 10 up-to a left-most view 90. Each of the series of views 100 is shown to be approximately evenly distributed within the viewing cone 180, i.e., being emitted at an approximately equal solid angle with respect to an origin of the viewing cone 180. It will be appreciated, however, that other suitable distributions of the series of views 100 within the viewing cone 180 may be equally possible.

A viewer, positioned in space before the 3D display 160, may obtain autostereoscopic viewing of the 3D image data 122 by observing any two different ones of the series of views 100, with a left eye of the viewer observing a left view of said two views and a right eye of the viewer observing a right view of said two views. This provides multiple viewing positions within the viewing cone 180 at which autostereoscopic viewing is provided. It will be appreciated, however, that a 3D display 160 may optimized for providing autostereoscopic viewing to a viewer perceiving two adjacent ones of the series of views instead of any two different ones. Hence, for sake of explanation, the invention will henceforth be explained for viewing positions where the viewer perceives said two adjacent ones of the series of views. FIG. 1 shows two examples of such viewing positions, i.e., a central viewing position 182 located near a central axis of the viewing cone 180, and an outermost viewing position 184 located near a side or border of the viewing cone 180. At both these viewing positions, the viewer perceives two adjacent ones of the series of views.

It is noted, that the term viewing position is understood to refer to all the positions in which a specific two adjacent ones of the series of views can be perceived. Thus, e.g., the central viewing position 182 is understood to refer to all positions that the viewer can assume within the viewing cone 180 in which a left eye perceives a view 50 of the series of views 100 and a right eye perceives a view 40 of the series of views 100.

During operation of the indicator generator 140, the indicator generator establishes the graphical shape in the 3D image data 122 for, when being displayed on the 3D display 160, providing to the viewer a position indicator graphically representing a relative position of the two adjacent ones of the series of views within the series of views.

Here, the term graphical shape refers to a drawn or written element having a certain spatial attribute, such as a certain orientation or a certain spatial arrangement. The term establishing the graphical shape in the 3D image data refers to including or generating the graphical shape as image and/or depth data in the 3D image data. The term position indicator refers to a graphical representation provided to the viewer perceiving the two adjacent ones of the series of views as a result of the graphical shape being established in the 3D image data. The position indicator may be referred to as sweetspot indicator for expressing a configuration of the position indicator for directing the viewer to a so-termed sweetspot of the 3D display, i.e., an optimal viewing position in front of the 3D display.

The 3D image data 122 may be so-termed multi-view image data, i.e., comprising image data for each, or a subset, of the series of views 100. Although not shown in FIG. 1, the device 120 may, for that purpose, comprise a view renderer for generating the 3D image data 122 from, e.g., 2D image data plus depth data or from stereo image data. The view renderer may be a view renderer as described in WO1997/023097-A3.

Figure 2A:
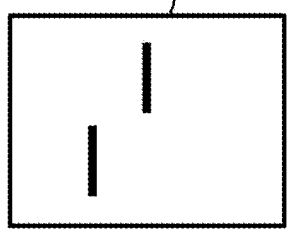
FIGS. 2a-2i together show a first series of graphical shapes.
Figure 2B:
Figure 2C:
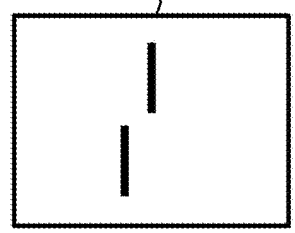
Figure 2D:
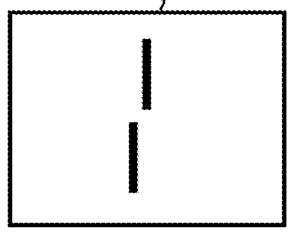
Figure 2E:
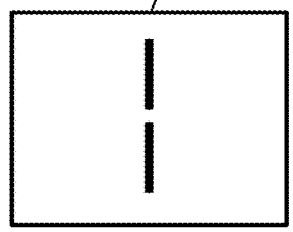

The indicator generator 140 may establish the graphical shape in the 3D image data 122 by including a graphical shape 204, as depicted in FIG. 2e, in the image data of a central view 50 of the series of views 100. Thus, a viewer positioned at the central viewing position 182 will perceive with his left eye the graphical shape 204 being part of the central view 50. The graphical shape 204 may be included in the view by, e.g. overlaying the graphical shape 204 in the image data corresponding to the central view 50. Thus, next to image data showing, e.g., a view of a 3D scene, the image data now also comprises the graphical shape 204. The graphical shape 204 may be included in a corner of the image data of the central view 50 to be relatively unobtrusive, i.e., not to distract too much from the view of the 3D scene itself. It will be appreciated that in that case, the viewer will perceive the graphical shape 204 in a viewing cone that originates from a corner of the 3D display 160.

The graphical shape 204 functions, when being displayed on the 3D display 160, as a position indicator that graphically represents a relative position of the two adjacent ones of the series of views within the series of views. For that purpose, the graphical shape 204 is shown in FIG. 2e to consist of two elements, of which the relative spatial alignment is varied for graphically representing said relative position. In this particular example, the graphical shape 204 comprises a reference shape and a position shape, with the reference shape being a line representing a center of the series of views 100, i.e., the central view 50, the position shape being a line representing the currently perceived view, and the spatial alignment between the reference line and the position line representing a relative position of the currently perceived view within the series of views 100 with respect to the central view 50. Since the graphical shape 204 is included in the central view 50, both the reference line and the position line are spatially aligned to indicate that the currently shown view coincides with the central view 50. Thus, a viewer perceiving the central view 50 in either of his eyes will be provided with a position indicator graphically representing a relative position of the currently perceived view within the series of views, i.e., the position indicator indicates to the viewer at the central viewing position 182 that he currently perceives the central view 50.

It will be appreciated that the above position indicator inherently also indicates the relative position of the two adjacent ones of the series of views to the viewer, given that the central view 50 is perceived by the viewer as part of the two adjacent ones of the series of views, i.e., as part of stereoscopic viewing. Thus, a viewer perceiving the position indicator may conclude that he is positioned such in the series of views that he perceives the central view 50 as well as a further view that is adjacent to the central view 50.

It is noted that the position indicator may provide a relative position with respect to a different one than the central view 50. For example, the position indicator may provide the relative position of the currently perceived view within the series of views with respect to a left-most view 90 and/or right-most view 10, or with respect to one or more views within the series of views that are expected to have a lowest amount of artifacts.

Figure 2F:
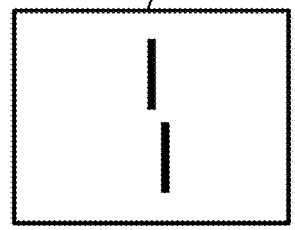
Figure 2G:
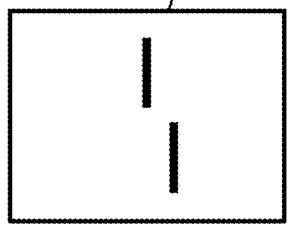
Figure 2H:
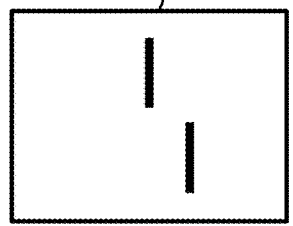
Figure 2I:
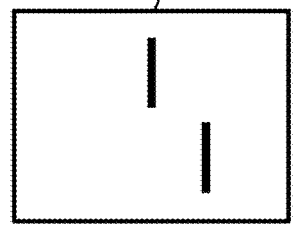

The indicator generator 140 may also establish a series of graphical shapes in the 3D image data 122. For example, the indicator generator 140 may establish the graphical shape 200 shown in FIG. 2a in a left-most view 90, the graphical shape 201 shown in FIG. 2b in an intermediate view 80, etc, up until establishing the graphical shape 208 shown in FIG. 2i in a right-most view 10. As a consequence, the viewer perceiving any two adjacent ones of the series of views is shown a respective one of a series of position indicators graphically representing the relative position of the respective two adjacent ones of the series of views within the series of view. For example, a viewer positioned at the central viewing position 182 will perceive the position indicator as a merger, i.e., an averaging, of the graphical shapes 204 of FIG. 2e and 205 of FIG. 2f, indicating the relative position of the two adjacent views 40, 50 perceived in the central viewing position 182. As a result, the viewer may perceive a position indicator as shown in FIG. 5a and later on further explained.

Figure 3A:
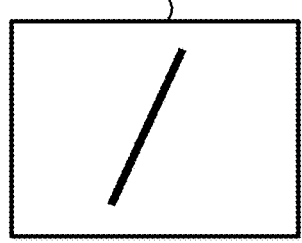
FIGS. 3a-3e together show a second series of graphical shapes.
Figure 3B:
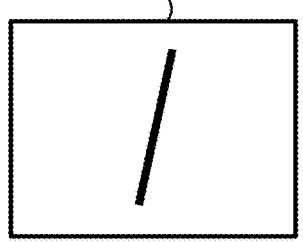
Figure 3C:
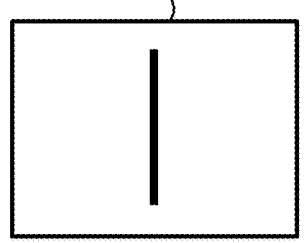
Figure 3D:
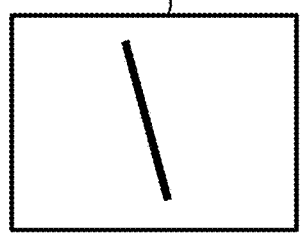
Figure 3E:
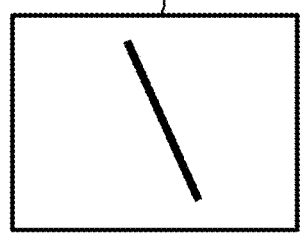

FIGS. 3a-3e show a further series of graphical shapes that are arranged for graphically representing the relative position by means of a slope of a line. Here, a vertical, i.e., non-sloped line, as shown in FIG. 3c indicates a central view 50, and views towards the left are indicated by the line sloping towards the right. As such, a position indicator that is, on average, sloped towards the right can be intuitively interpreted by the viewer as indicating that a center of the series of views 100 is towards the right of the currently shown view, i.e. the currently shown view is towards the left of the center of the series of views 100.

Figures 4A, 4B, 4C:
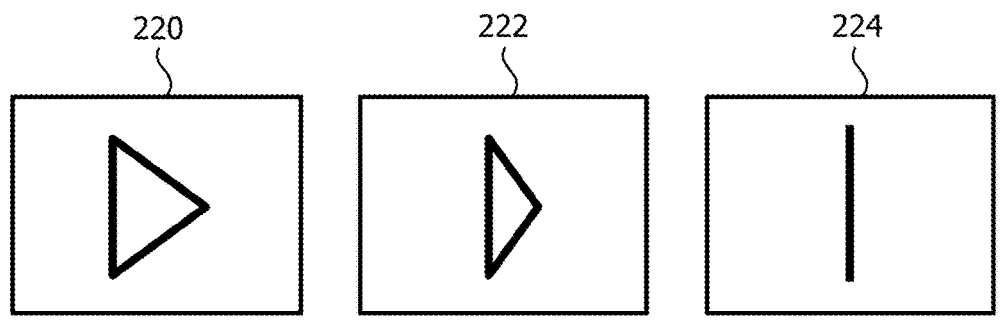
FIGS. 4a-4e together show a third series of graphical shapes.
Figures 4D, 4E:
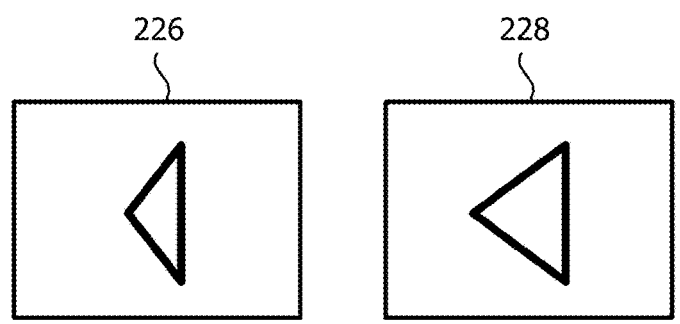

FIGS. 4a-4e show a further series of graphical shapes that are arranged for graphically representing the relative position by means of a size and direction of a triangle. Here, a triangle pointing towards the right, as shown in FIG. 4a, indicates that the viewer is perceiving a view that is located far left of a center of the series of views 100, a smaller triangle pointing towards the right, as shown in FIG. 4b, indicates that the viewer is perceiving a view that is located left of the center of the series of views 100, etc. Here, the center view 50 may be indicated with a vertical line, as shown in FIG. 4c.

Figure 5A:
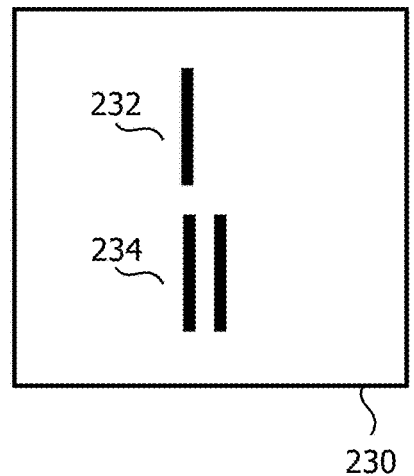
FIG. 5a shows a visual impression of a position indicator on a 3D display exhibiting no or little optical cross-talk between adjacent views.

FIG. 5a shows a visual impression of a position indicator 230 that is perceived by the viewer at the central viewing position 182 when the indicator generator 140 is arranged for establishing the series of graphical shapes shown in FIGS. 2a-i in the 3D image data 122. The viewer positioned at the central viewing position 182 will therefore perceive the position indicator as a merger, i.e., an averaging, of the graphical shapes 204 of FIG. 2e and 205 of FIG. 2f. Clearly visible is that, as a result of the reference line 232 coinciding in position in the graphical shapes 204 and 205, the merger of said graphical shapes yields an overlapping reference line 232. As a result, the viewer perceiving any two adjacent ones of the series of views will, irrespective of his viewing position, perceive the reference line 232 statically remaining in place to indicate a position of the center of the series of views 100, whereas the position lines 234 are perceived to vary in place across the series of views 100.

Figure 5B:
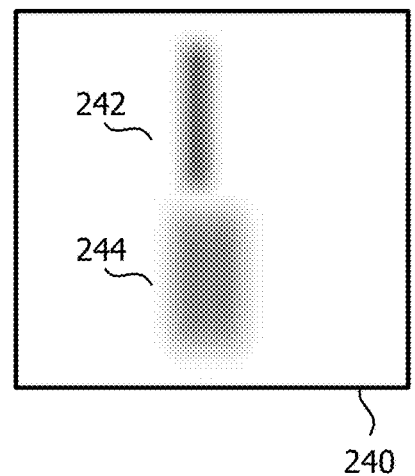
FIG. 5b shows a visual impression of the position indicator on a 3D display exhibiting substantial optical cross-talk between adjacent views.

The position indicator 230 may be the result of the 3D image data 122 being displayed on a 3D display 160 having little or no optical cross-talk between adjacent views. Such optical cross-talk typically exists in autostereoscopic 3D displays for various reasons, resulting in a view being emitted by the 3D display also comprising attenuated versions of adjacent views. The visual impression of such optical cross-talk to the viewer may in some cases be that of spatial blurring. FIG. 5b shows an example of a position indicator 240 on a 3D display exhibiting substantial optical cross-talk between adjacent views. When comparing the position indicator 230 of FIG. 5a with the position indicator 240 of FIG. 5b, it will be appreciated that the latter is more blurred in that the position lines 244, which were visible as individual position lines 234 in FIG. 5a, have blurred to a point of becoming a single position shape 244 graphically representing to the viewer a relative position of the two adjacent ones of the series of views within the series of views.

It will be appreciated that, irrespective of a presence of optical cross-talk, the viewer may perceive the position lines 234 shown in FIG. 5a as a single position line due to a fusion by the human visual system of the viewer. Thus, the viewer may in practice perceive a single position line located in between the position lines 234. It will also be appreciated that the series of graphical shapes may be specifically arranged for, when being displayed as a position indicator in two adjacent ones of the series of views, yielding a visual impression of the position indicator comprising a single position shape rather than two distinct elements. A reason for this is that a single position shape may be more intuitive to the viewer, as the viewer may relate the position indicator to a current, single, position in the viewing cone rather than a relative position of the two different ones of the series of views within the series of views. The fusion by the human visual system may be facilitated by, e.g., varying the distance and/or shape of adjacent ones of the series of graphical shapes only in suitably small increments in order to yield similar adjacent graphical shapes.

The 3D image data 122 may be so-termed 2D image data plus depth data. Although not shown in FIG. 1, the 3D display 160 may, for that purpose, comprise a view renderer for generating the series of views 100 from the 3D image data 122.

Figure 6A:
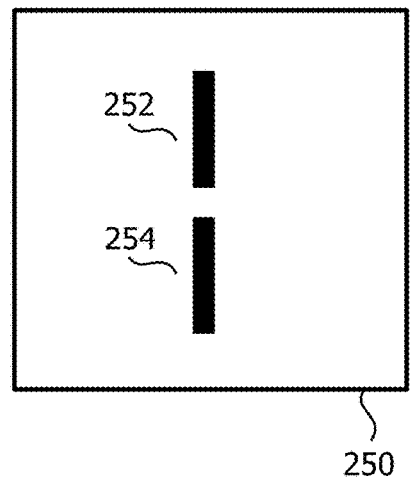
FIG. 6a shows a graphical shape established in 2D image data.
Figure 6B:
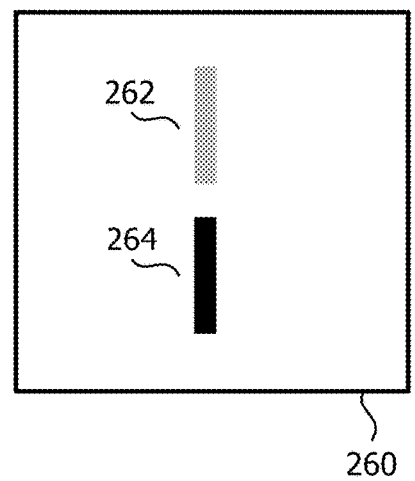
FIG. 6b shows the graphical shape established in depth data.

The indicator generator 140 may establish the graphical shape in the 3D image data 122 by including a graphical shape 250, as depicted in FIG. 6a, in the 2D image data, and a depth 260 of the graphical shape 250, as depicted in FIG. 6b, in the depth data.

FIG. 6a shows that the graphical shape 250 comprises a reference shape 252 and a position shape 254, with the reference shape being a line representing a center of the series of views 100, i.e., the central view 50, the position shape being a line representing the currently perceived view, and the spatial alignment between the reference line and the position line representing a relative position of the currently perceived view within the series of views 100 with respect to the central view 50. As such, the graphical shape 250 shown in FIG. 6a may be similar or identical to the graphical shape 204 shown in FIG. 2e.

FIG. 6b shows that the depth 260 of the graphical shape 250 comprises a reference shape depth 262 and a position shape depth 264. It is shown in FIG. 6b that the reference shape 252 is established in the depth data at a neutral depth, i.e., the reference shape depth 262 has a neutral depth value. Here, the term neutral depth refers to a depth that is chosen such that, when the 3D image data 122 is displayed on the 3D display 160, a resulting reference part of the position indicator is established on a display plane of the 3D display, i.e., does not seem to protrude from or recess into the 3D display 160. For example, when the depth data has a range of 8-bit, i.e., assumes a depth value between 0 and 255, the neutral depth may coincide with a depth value of 127. FIG. 6b also shows that the position shape 254 is established in the depth data at a non-neutral depth, i.e., the position shape depth 264 has a non-neutral depth value. Therefore, a resulting position part of the position indicator is established as protruding or recessing from the display plane of the 3D display 160, i.e., seems to protrude from or recess into the 3D display 160.

As a result of the graphical shape 250 and its depth 260, a viewer will perceive a position indicator comprising a reference part that is established on the display plane of the 3D display 160 and effectively resembles a 2D reference part, in that its position on the 3D display 160 does not vary between any two adjacent ones of the series of views 100. The position part, however, does vary in position on the 3D display given that it is established as protruding or recessing from the display plane of the 3D display 160. Moreover, the reference part and the position part will be spatially aligned in the central view 50, and will be misaligned in an increasing degree when deviating from the central view 50 towards, e.g., a left-most view 90 within the series of views 100. As a consequence, the viewer perceiving any two adjacent ones of the series of views 100 is shown a respective one of a series of position indicators graphically representing the relative position of the respective two adjacent ones of the series of views within the series of view 100.

It will be appreciated that the above arrangement of the position indicator is automatically established in the series of views 100 by a view renderer receiving the 2D image data plus depth data 122 comprising the graphical shape 250 and its depth 260. A reason for this is that a view renderer, in response to the position shape depth 264 being non-neutral, will typically shift the position shape 254 in accordance with the position shape depth 264 in order to generate the position shape in each of the series of views 100. However, the view renderer will not shift the reference shape 252 due to its reference shape depth 262 being neutral. Thus, the view renderer will, in response to the 2D image data plus depth data 122, generate a series of graphical shapes that is similar to those shown in FIGS. 2a-i.

The graphical shape 250 may be established in the 2D image data by mixing the graphical shape with the 2D image data, e.g., using a so-termed alpha-blending technique as is known from the field of video processing. The depth 260 of the graphical shape may be established in the depth data by replacing any corresponding depth values in the depth data.

It will also be appreciated that a similar position indicator may also be established in stereo image data. For example, right image data and left image data may each comprise a reference shape at a same position for establishing the reference shape at a neutral depth, and the right image data and the left image data may each comprise a position shape at a different position for establishing the position shape at a non-neutral depth. As such, the left image data may comprise the graphical shape 200 shown in FIG. 2a, and the right image data may comprise the graphical shape 208 shown in FIG. 2i. A view interpolator may then, when converting the stereo image data to multi-view image data for display on the 3D display 160, automatically generate a series of graphical shapes that is similar to those shown in FIGS. 2*a-i*.

Figure 7A:
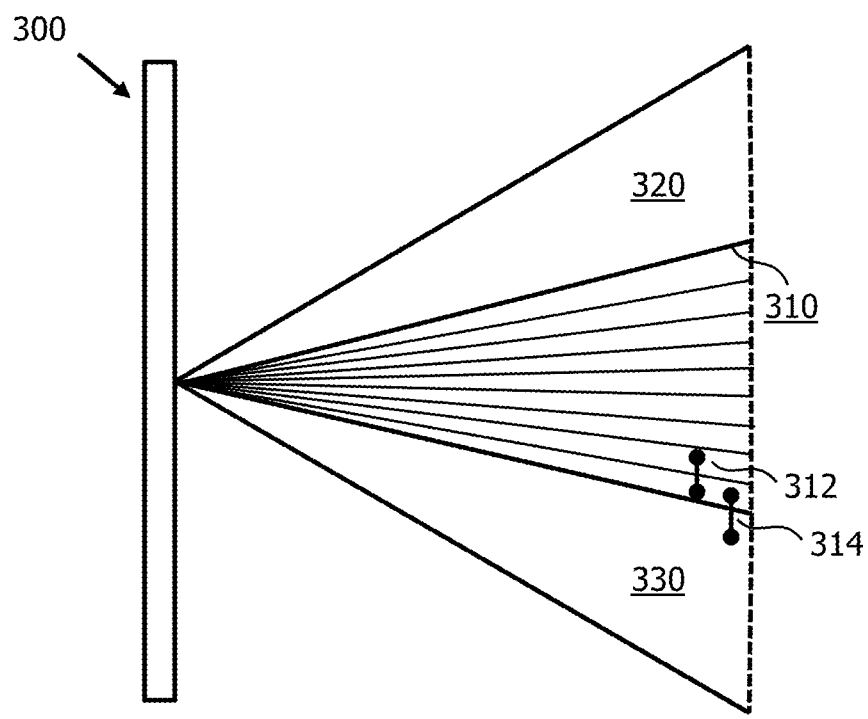
FIG. 7a shows a 3D display emitting the series of views in a series of repeated viewing cones, and a stereoscopic and pseudoscopic viewing position.
Figures 7B, 7C:
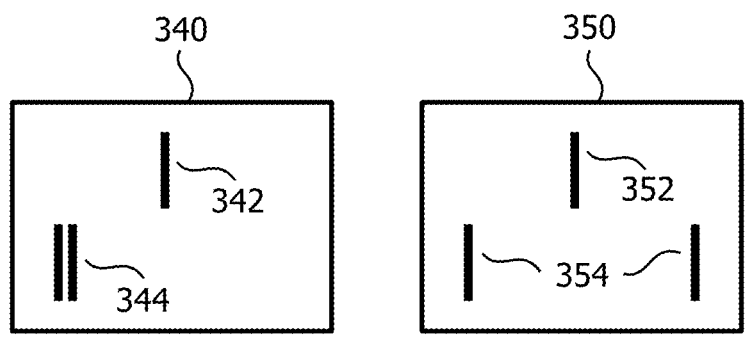
FIG. 7b shows a position indicator at the stereoscopic viewing position.
FIG. 7c shows a position indicator at the pseudoscopic viewing position.

FIG. 7*a* shows a 3D display 300 being arranged for emitting the series of views in a series of repeated viewing cones, with a central viewing cone 310, a first repeated viewing cone 320, and a second repeated viewing cone 330 of the series of repeated viewing cones being depicted. The indicator generator may establish a series of graphical shapes in the 3D image data that is being displayed on the 3D display 300. For example, the indicator generator may establish the graphical shape 200 shown in FIG. 2*a* in a left-most view, the graphical shape 201 shown in FIG. 2*b* in an intermediate view, etc, up until establishing the graphical shape 208 shown in FIG. 2*i* in a right-most view of the central viewing cone 310. As a consequence, a viewer positioned in an outermost viewing position 312 located near a side or border of the central viewing cone 310 will perceive a position indicator 340 as shown in FIG. 7*b*. However, the viewer may also be accidentally positioned in a pseudoscopic viewing position 314, where he may perceive a left-most view of the central viewing cone 310 in his right eye and a right-most view of the second repeated viewing cone 330 in his left eye. As a consequence, the viewer will perceive a position indicator 350 as shown in FIG. 7*c*. This position indicator 350 is a merger, i.e., an averaging, of the graphical shapes 200 of FIG. 2*a* and 208 of FIG. 2*i* owing to the fact that the left-most view of the central viewing cone 310 corresponds to the graphical shape 200 shown in FIG. 2*a* and the right-most view of the second repeated viewing cone 330 corresponds to the graphical shape 208 shown in FIG. 2*i*. As a result, the position parts 354 of the position indicator 350 will both be misaligned with respect to the reference part 352, as well as be located on opposite sides with respect to the reference part 352. Thus, the viewer will perceive a distinctly shaped position indicator 350, thereby obtaining feedback that he is positioned in a pseudoscopic viewing position 314.

Figure 8A:
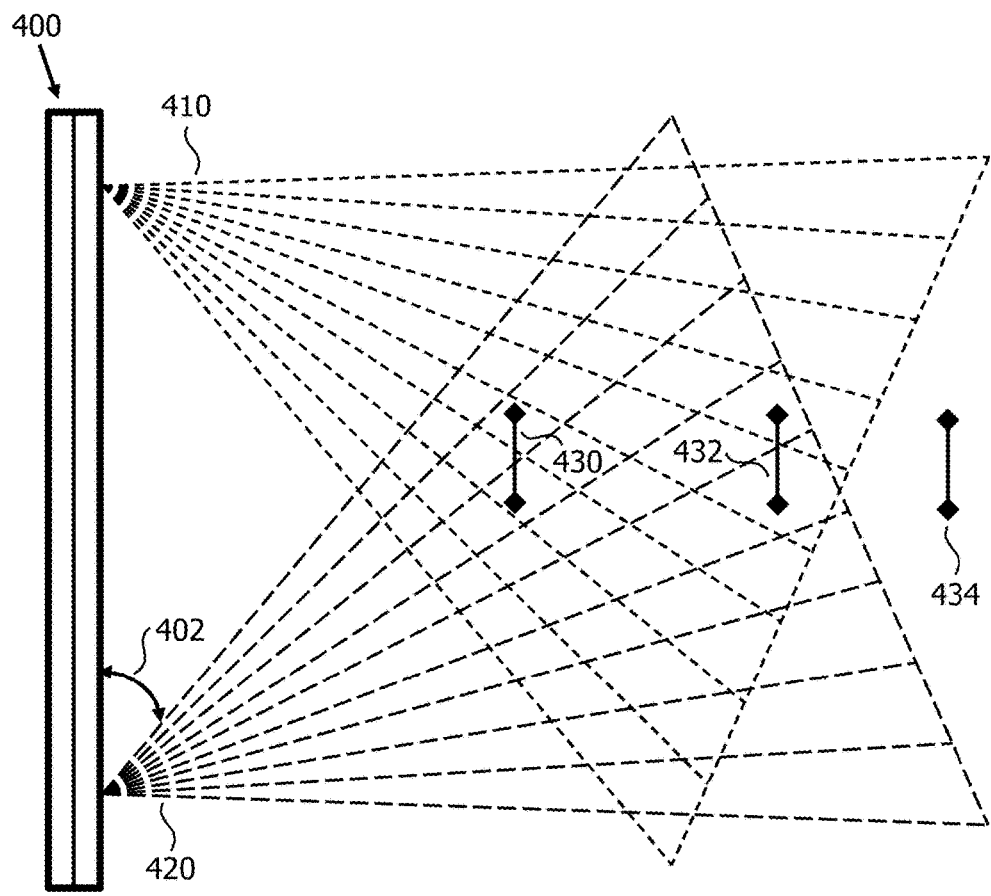
FIG. 8a shows a 3D display optimized for a viewing distance by emitting the viewing cone at a varying emission angle across a display plane of the 3D display.

FIG. 8*a* shows a 3D display 400 being optimized for a viewing distance by emitting the viewing cone 410, 420 at a varying emission angle 402 across a display plane of the 3D display 400. As a result, the viewing cone is emitted at different angles across the 3D display. For sake of explanation, FIG. 7*a* only shows the viewing cone being emitted at a right-hand side of the 3D display 400, i.e., as a right-hand viewing cone 410, and being emitted at a left-hand side of the 3D display 400, i.e., as a left-hand viewing cone 420. The varying emission angle 402 is typically chosen to provide a convergence of the series of views of the right-hand viewing cone 410 and of the left-hand viewing cone 420. This allows a viewer, positioned at an optimal viewing distance 432, to perceive with his left eye a central view on both a left-hand side of the 3D display 400, i.e., in the left-hand viewing cone 420, as well as on a right-hand side of the 3D display 400, i.e., in the right-hand viewing cone 410. It will be appreciated that when the viewer is positioned closer to the 3D display 400, e.g., at the closer viewing position 430, or farther from the 3D display 400, e.g., at the farther viewing position 434, he may not be able to perceive a same view all across the 3D display 400. As a result, the viewing experience may be sub-optimal when the viewer is positioned at the closer viewing position 430 or at the farther viewing position 434.

The indicator generator may be arranged for establishing a graphical shape in the 3D image data at the left-hand side of the 3D display 400 for providing a position indicator in the left-hand viewing cone 420, and a further graphical shape in the 3D image data at the right-hand side of the 3D display 400 for providing a further position indicator in the right-hand viewing cone 410. For that purpose, the indicator generator may establish a graphical shape 204, as depicted in, e.g., FIG. 2*e*, in a central view of the right-hand viewing cone, and a same graphical shape 204 in a central view of the left-hand viewing cone. Consequently, the viewer will be able to observe the position indicator and the further position indicator in the optimal viewing position 432, but neither in the closer viewing position 430 nor the farther viewing position 434. Thus, the position indicator and the further position indicator together function as a viewing distance indicator 440, 450, 460.

Figure 8B:
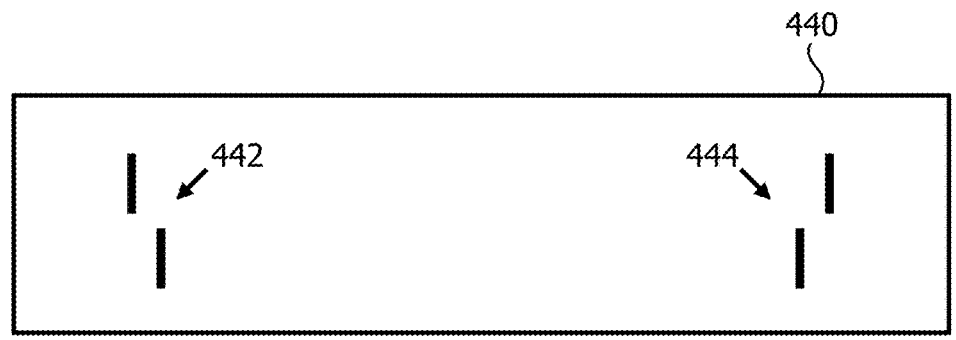
FIGS. 8b-d show a position indicator and a further position indicator, together constituting a viewing distance indicator, at varying viewing distances.
Figure 8C:
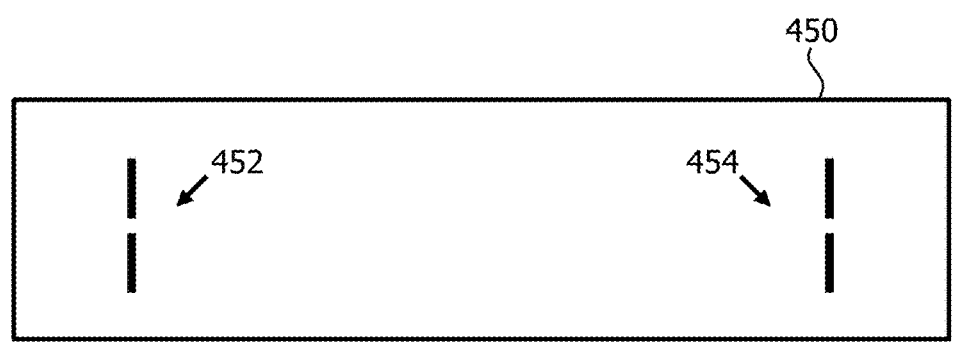
Figure 8D:
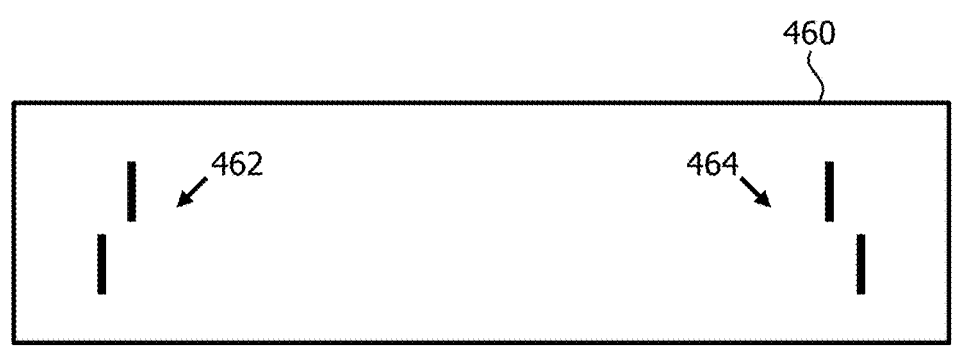

The indicator generator may also establish a series of graphical shapes in the 3D image data. For example, the indicator generator may establish the series of graphical shapes shown in FIGS. 2*a-i* in the series of views of both the left-hand viewing cone 420 and the right-hand viewing cone 410. As a result, a viewer positioned at the closer viewing position 430 will perceive the position indicator 442 and the further position indicator 444 shown in FIG. 8*b* (it is noted that, for sake of explanation, each of FIGS. 8*b*, 8*c* and 8*d* correspond to a perception with a left eye of the viewer and not to stereoscopic perception). This may indicate to the viewer that he is positioned too close to the 3D display 400. Similarly, a viewer positioned at the farther viewing position 434 will perceive the position indicator 462 and the further position indicator 464 shown in FIG. 8*d*. This may indicate to the viewer that he is positioned too far away from the 3D display 400. Finally, a viewer position at the optimal viewing position 432 will perceive the position indicator 452 and the further position indicator 454 as shown in FIG. 8*c*. This may indicate to the viewer that he is positioned at the optimal viewing distance with respect to the 3D display 400.

It will be appreciated that the position indicator and the further position indicator still function as position indicators with respect to a left-right movement within the viewing cone. In this case, the position part of both position indicators will have a common horizontal offset with respect to the reference part indicating a relative position with respect to the center of the viewing cone, and a distance between the position parts of both position indicators indicating a viewing distance with respect to the optimal viewing distance. A viewer may thus only perceive the position indicator 452 and the further position indicator 454 shown in FIG. 8*c* when being positioned at both the optimal viewing distance as well as in a center of the left-hand viewing cone 420 and right-hand viewing cone 410.

Figure 9:
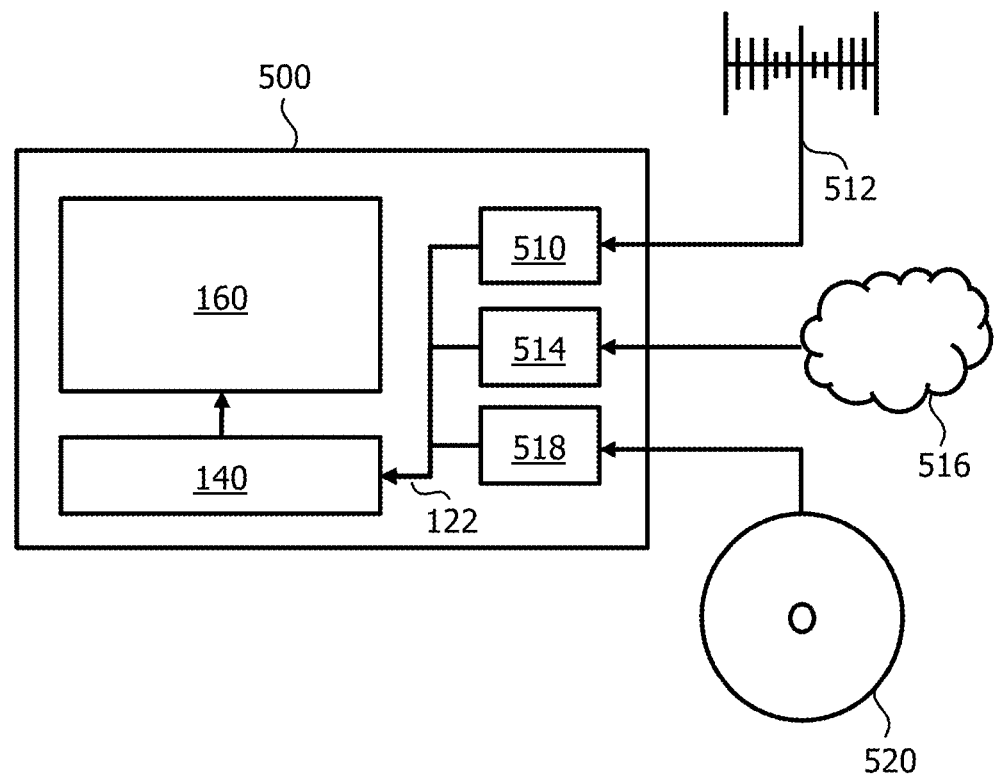
FIG. 9 shows a device comprising the 3D display, a broadcast receiver, an internet receiver and a storage medium reader.

FIG. 9 shows a device 500 comprising the 3D display 160 for displaying the 3D image data 122, a broadcast receiver 510 for receiving the 3D image data 122 from a broadcast transmission 512, an internet receiver 514 for receiving the 3D image data 122 from internet 516 and a storage medium reader 518 for reading the 3D image data 122 from a storage medium 520. It will be appreciated, however, that the device 500 may, instead of comprising all of the aforementioned components, comprise only a subset of said component. The device 500 may be, e.g., a 3D television comprising a lenticular-based multi-view 3D display 160. The device 500 may also be e.g. Blu-ray player, a Blu-ray recorder, a set-top box, personal computer, harddisk recorder etc, in which case the device is typically not provided with the 3D display 160. Although not shown in FIG. 9, the device 500 may comprise user input means for allowing a user to instruct the indicator generator 140 to either turn on or turn off the establishing of the graphical shape in the 3D image data 122. The user input means may be a remote control signal receiver for allowing the user to instruct the indicator generator 120 using a remote control. Thus, the user may turn on or off the display of the position indicator on the 3D display 160. Moreover, the position indicator may be part of an On-Screen Display (OSD) functionality of the device 500, and thus be displayed on the 3D display 160 in a similar manner as, e.g., a volume or channel indicator.

The broadcast receiver 510 may be of any suitable type, e.g. for receiving terrestrial, satellite or cable broadcasts. The internet receiver 514 may also be of any suitable type, and may include modem functionality as required by e.g. ADSL, Ethernet, WLAN, UMTS etc, or be an interface protocol, e.g. TCP/IP. The storage medium reader 518 may be of any suitable type for reading 3D image data 122 from a storage medium 520, the storage medium 520 being of any suitable type, e.g. Blu-ray, DVD, flash-memory, ROM, RAM etc.

Figure 10:
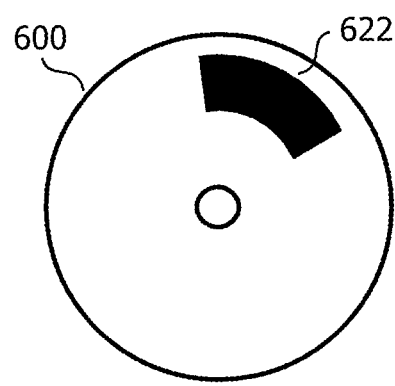
FIG. 10 shows a storage medium comprising the 3D image data.

FIG. 10 shows a storage medium 600 comprising 3D image data 620, with the 3D image data 620 comprising a graphical shape for, when being displayed on a 3D display, providing to the viewer a position indicator graphically representing a relative position of the two adjacent ones of the series of views within the series of views. The storage medium 600 may be any suitable information carrier, such as Blu-ray disc, DVD disc, hard disk, etc., and may be non-recordable or recordable. In the former case, the storage medium 600 is manufactured to contain the 3D image data 620 by converting the 3D image data 620 into physical marks on the information carrier during manufacturing. In the latter case, the 3D image data 620 is typically recorded on to the storage medium 600 by a consumer or a content creator, the step of recording involving converting the 3D image data 620 into physical marks on the storage medium 600. The graphical shape may be included in the 3D image data 620 in a manner that allows a storage medium reader, e.g., a Bluray player, to turn on or off the display of the position indicator on the 3D display 160. For that purpose, the graphical shape may be included in the 3D image data 620 as auxiliary image data.

It will be appreciated that the above description for clarity has described embodiments of the invention with reference to different functional units. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A device for processing three-dimensional image data, the device comprising:
 a three-dimensional display,
  wherein the three-dimensional display is arranged for adjacently providing, in a viewing cone, a series of views of the three-dimensional image data,
  wherein the series of views enable autostereoscopic viewing of the three-dimensional image data by a viewer perceiving two different ones of the series of views at multiple viewing positions in the viewing cone,
 an indicator generator,
 wherein the indicator generator is configured to place a graphical shape in the three-dimensional image data,
 wherein a display of the graphical shape on the three-dimensional display provides to the viewer a position indicator,
 wherein the position indicator graphically represents a relative position of the two different ones of the series of views within the series of views,
 wherein the graphical shape comprises a reference shape for graphically representing a reference position of a reference view within the series of views,
 wherein the graphical shape comprises a position shape for graphically representing a current position of the two different ones of the series of views within the series of views,
 wherein the display of the graphical shape on the three-dimensional display provides to the viewer a reference part and a position part of the position indicator,
 wherein the display of the graphical shape has a relative spatial alignment graphically representing the relative position of the two different ones of the series of views within the series of views,
 wherein the graphical shape can provide an indication of a pseudoscopic perception of the three-dimensional image data, wherein the indication is perceivable as a change in size between at least two of the graphical shapes in the series of views.

2. The device according to claim 1,
wherein the indicator generator places a series of graphical shapes in the three-dimensional image data,
wherein the display of the series of graphical shapes on the three-dimensional display provides to the viewer observing any two different ones of the series of views a respective one of a series of position indicators graphically representing the relative position of the respective two different ones of the series of views within the series of views.

3. The device according to claim 1,
wherein the three-dimensional display is arranged for providing the series of views in a series of repeated viewing cones,
wherein the indicator generator places the graphical shape in the three-dimensional image data,
wherein the display of the graphical shape on the three-dimensional display provides to the viewer observing an outermost one of the series of views the position indicator for graphically indicating to the viewer a vicinity of a repeated viewing cone.

4. The device according to claim 1,
wherein the indicator generator places the graphical shape in the three-dimensional image data,
wherein the display of the graphical shape on the three-dimensional display provides to the viewer observing a central one of the series of views the position indicator for graphically indicating to the viewer a vicinity of a center of the viewing cone.

5. The device according to claim 1,
wherein the three-dimensional display is optimized for a viewing distance by providing the viewing cone at a varying emission angle across a display plane of the three-dimensional display,
wherein the indicator generator is arranged for placing a further graphical shape in the three-dimensional image data,
wherein a display of the further graphical shape on the three-dimensional display provides to the viewer a further position indicator graphically representing the relative position of the two different ones of the series of views within the series of views, the position indicator and the further position indicator together constituting a viewing distance indicator.

6. The device according to claim 5, wherein the position indicator and the further position indicator are on opposite sides of the three-dimensional display.

7. The device according to claim 1,
wherein the device further comprises a view renderer for generating the series of views in dependence on the three-dimensional image data,
wherein the view renderer comprises the indicator generator,
wherein the indicator generator is arranged for placing the graphical shape in the two different ones of the series of views.

8. The device according to claim 1, wherein the device includes at least one of the group of a broadcast receiver for receiving the three-dimensional image data from a broadcast transmission, an internet receiver for receiving the three-dimensional image data from the internet, and a storage medium reader for reading the three-dimensional image data from a storage medium.

9. The device according to claim 1, wherein the three-dimensional image data comprises:
two-dimensional image data, and
depth data for representing a depth of the two-dimensional image data,
wherein the indicator generator is arranged to provide the reference shape in the depth data at a neutral depth of a display plane of the three-dimensional display;
wherein the indicator generator is arranged to provide the position shape in the depth data at a non-neutral depth of the display plane of the three-dimensional display.

10. A non-transitory storage medium comprising three-dimensional image data for display on a three-dimensional display,
wherein the three-dimensional display is arranged for adjacently providing, in a viewing cone, a series of views of the three-dimensional image data,
wherein the series of views enabling autostereoscopic viewing of the three-dimensional image data by a viewer perceiving two different ones of the series of views at multiple viewing positions in the viewing cone,
wherein the three-dimensional image data comprises a graphical shape,
wherein a display of the graphical shape on the three-dimensional display provides to the viewer a position indicator graphically representing a relative position of the two different ones of the series of views within the series of views,
wherein the graphical shape comprises a reference shape for graphically representing a reference position of a reference view within the series of views,
wherein the graphical shape comprises a position shape for graphically representing a current position of the two different ones of the series of views within the series of views,
wherein the graphical shape is arranged in the three-dimensional 3D image data,
wherein the display of the graphical shape on the three-dimensional display provides to the viewer a reference part and a position part of the position indicator having a relative spatial alignment graphically representing the relative position of the two different ones of the series of views within the series of views,
wherein the graphical shape can provide an indication of a pseudoscopic perception of the three-dimensional image data,
wherein the indication is perceivable as a change in size between at least two of the graphical shapes in the series of views.

11. The non-transitory storage medium according to claim 10,
wherein the three-dimensional image data comprises two-dimensional image data and depth data for representing a depth of the two dimensional image data,
wherein the relative spatial alignment of the reference part and the position part of the position indicator is provided by establishing the reference shape in the depth data at a neutral depth to provide the reference part of the position indicator on a display plane of the three-dimensional display, and establishing the position shape in the depth data at a non-neutral depth to provide the position part of the position indicator protruding or recessing from the display plane of the three-dimensional 3D display.

12. A method of processing three-dimensional image data for display on a three-dimensional display, wherein the three-dimensional display is arranged for adjacently providing, in a viewing cone, a series of views of the three-dimensional image data, wherein the series of views enable autostereoscopic viewing of the three-dimensional image data by a viewer perceiving two different ones of the series of views at multiple viewing positions in the viewing cone, the method comprising:
placing a graphical shape in the three-dimensional image data;
displaying the graphical shape on the three-dimensional display to provide to the viewer a position indicator;
graphically representing a relative position of the two different ones of the series of views within the series of views;
wherein the graphical shape includes a reference shape for graphically representing a reference position of a reference view within the series of views, and a position shape for graphically representing a current position of the two different ones of the series of views within the series of views
wherein the graphical shape is arranged in the three-dimensional image data,
wherein displaying the graphical shape on the three-dimensional display provides to the viewer a reference part and a position part of the position indicator,
wherein the position part has a relative spatial alignment graphically representing the relative position of the two different ones of the series of views within the series of views, and
providing an indication to the viewer that the viewer has a pseudoscopic perception of the three-dimensional image data,
wherein the indication is perceivable as a change in size of at least two of the graphical shapes in the series of views.

13. A computer program embodied in a non-transitory machine-readable medium comprising instructions for causing a processor system to perform the method according to claim 12.

14. A device for processing three-dimensional image data, the device comprising:
a three-dimensional display,
wherein the three-dimensional display is arranged for adjacently providing, in a viewing cone, a series of views of the three-dimensional image data,
wherein the series of views enable autostereoscopic viewing of the three-dimensional image data by a viewer perceiving a first view of the series of views and a second view of the series of views at multiple viewing positions in the viewing cone,
an indicator generator,
wherein the indicator generator is configured to place a first graphical shape in the three-dimensional image data of the first view of the series of views and a second graphical shape in the three-dimensional data of the second view of the series of views,
wherein a display of the graphical shape on the three-dimensional display provides to the viewer a position indicator,
wherein the position indicator graphically represents a relative position of the first view of the series of views and the second view of the series of views within the series of views,
wherein the graphical shape comprises a reference shape for graphically representing a reference position of a reference view within the series of views,
wherein the graphical shape comprises a position shape for graphically representing a current position of the first view and the second view of the series of views within the series of views,
wherein the display of the graphical shape on the three-dimensional display provides to the viewer a reference part and a position part of the position indicator,
wherein the display of the graphical shape has a relative spatial alignment graphically representing the relative position of the first view of the series of views and the second view of the series of views within the series of views,
wherein the graphical shape can provide an indication of a pseudoscopic perception of the three-dimensional image data,
wherein the first graphical shape is perceivable as wider than the second graphical shape.

15. A method of processing three-dimensional image data for display on a three-dimensional display, wherein the three-dimensional display is arranged for adjacently providing, in a viewing cone, a series of views of the three-dimensional image data, wherein the series of views enable autostereoscopic viewing of the three-dimensional image data by a viewer perceiving a first view of the series of views and a second view of the series of views at multiple viewing positions in the viewing cone, the method comprising:
placing a first graphical shape in the three-dimensional image data of the first view of the series of views and a second graphical shape in the three-dimensional data of the second view of the series of views;
displaying the graphical shape on the three-dimensional display to provide to the viewer a position indicator;
graphically representing a relative position of the first view of the series of views and the second view of the series of views within the series of views;
wherein the graphical shape includes a reference shape for graphically representing a reference position of a reference view within the series of views, and a position shape for graphically representing a current position of the first view of the series of views and the second view of the series of views within the series of views
wherein the graphical shape is arranged in the three-dimensional image data in the first view of the series of views and the second view of the series of views,
wherein displaying the graphical shape on the three-dimensional display provides to the viewer a reference part and a position part of the position indicator,
wherein the position part has a relative spatial alignment graphically representing the relative position of the first view of the series of views and the second view of the series of views within the series of views, and
providing an indication to the viewer that the viewer has a pseudoscopic perception of the three-dimensional image data,
wherein the first graphical shape is perceivable as wider than the second graphical shape.

16. A non-transitory storage medium comprising three-dimensional image data for display on a three-dimensional display,
wherein the three-dimensional display is arranged for adjacently providing, in a viewing cone, a series of views of the three-dimensional image data, wherein the series of views enabling autostereoscopic viewing of the three-dimensional image data by a viewer perceiving a first view of the series of views and a second view of the series of views at multiple viewing positions in the viewing cone, wherein the three-dimensional image data comprises a first graphical shape and a second graphical shape, wherein a display of the graphical shape on the three-dimensional display provides to the viewer a position indicator graphically representing a relative position of the first view of the series of views and the second view of the series of views within the series of views, wherein the graphical shape comprises a reference shape for graphically representing a reference position of a reference view within the series of views, wherein the graphical shape comprises a position shape for graphically representing a current position of the first view of the series of views and the second view of the series of views within the series of views, wherein the graphical shape is arranged in the three-dimensional image data in at least two views of the series of views, wherein the display of the graphical shape on the three-dimensional display provides to the viewer a reference part and a position part of the position indicator having a relative spatial alignment graphically representing the relative position of the first view of the series of views and the second view of the series of views within the series of views, wherein the graphical shape can provide an indication of a pseudoscopic perception of the three-dimensional image data, wherein the first graphical shape is perceivable as wider than the second graphical shape.

\* \* \* \* \*